United States Patent Office 3,824,146
Patented July 16, 1974

3,824,146
PROCESS FOR BONDED FIBROUS STRUCTURE
AND PRODUCT THEREOF
Vincent Simon Ellis, Harrogate, England, assignor to
Imperial Chemical Industries Limited, London, England
No Drawing. Filed Dec. 20, 1971, Ser. No. 210,118
Claims priority, application Great Britain, Dec. 23, 1970,
61,169/70
Int. Cl. D04h 3/14, 1/54
U.S. Cl. 161—150                                11 Claims

ABSTRACT OF THE DISCLOSURE

Manufacture of adherent fibrous structure from fibers with a proportion of the surface being potentially adhesive, activation of the potential adhesive to form bonds, followed by chemical treatment of the adhesive to render it no longer potentially adhesive.

---

The present invention relates to fabrics of which the constituent fibres or filaments are retained, or of which the retention of the fibres or filaments is facilitated, by the presence of an activatable adhesive which has been activated and subsequently deactivated.

According to the present invention we provide a process for the manufacture of an adherent fibrous structure by the formation of a fibrous structure, web or fabric comprising fibres of which at least a proportion of the surface is comprised of a potentially adhesive polymer, activation of at least a proportion of the potentially adhesive polymer temporarily with formation of bonds between fibres, followed by chemical treatment of the potentially adhesive polymer to render it no longer potentially adhesive.

In the term "fibrous structure" we include yarns, threads, non-woven, woven and knitted fabrics, and non-woven shaped articles for example filters and pads.

By the term "adherent" we mean that permanent jointing is effected at at least a proportion of the fibre-fibre contacts.

The fibrous structures may be entirely composed of fibres which are each entirely composed of potentially adhesive polymer, in which case only a proportion of the polymer is rendered adhesive temporarily, for example by selective raising to the temperature at which the polymer becomes adhesive. This may be effected, for example, by pressing a heated member onto the fibrous structure at a selection of points for a duration insufficient to effect complete melting with loss of structure but sufficient to effect bonding. A proportion of fibres which are not wholly composed of potentially adhesive polymer, or which contain no potentially adhesive polymer, may be present, and bonding may be effected between potentially adhesive polymer only or between potentially adhesive and non-potentially adhesive polymer.

The fibrous structures may otherwise be entirely or partially composed of composite fibres of which at least one component is potentially adhesive and which forms at least a proportion of the surface of the fibre. Bonding may be effected only between composite fibres or between composite fibres and other fibres present. The rendering adhesive of the potentially adhesive polymer may, for example, be effected by raising the temperature of the whole of the fibrous structure above that at which activation of the potentially adhesive polymer occurs but below the softening temperature of the other component or components.

The activation of the potentially adhesive polymer may, for example, be by raising its temperature to that at which it becomes adhesive or by application of a volatile liquid which softens the polymer rendering it adhesive, the liquid being thereafter evaporated. In the latter case the subsequent chemical treatment will serve to render the potentially adhesive polymer no longer susceptible to softening by the liquid treatment, and possibly also no longer susceptible to activation by raising of its temperature, the bonds remaining intact.

By "chemical treatment" we mean the reaction of the potentially adhesive polymer with a reagent which changes it into polymer which is no longer potentially adhesive, or which can be rendered adhesive only by raising to a temperature higher than was required for this purpose before the chemical treatment.

The potentially adhesive polymer must be of such constitution that reaction with a reagent may render it no longer potentially adhesive. Examples of such polymers are those having an ester side chain on at least a proportion of the structural units. Preferably this proportion should be at least 50%. Examples of such polymers are cellulose esters and polyvinyl esters of appropriate softening point which may be activated in respect of adhesion by raising to the softening temperature. When adhesion has been effected, at least a proportion of the ester side chains may be subjected to hydrolytic treatment. In such case the hydrolytic treatment should be preferably such that at least 15% of the weight of the polymer is lost. The whole of the ester groupings may, however, be saponified. In either case, the polymer bearing ester side chains will be rendered non-potentially adhesive under the conditions which previously resulted in adhesion. Particularly useful polymers in this context are cellulose acetate/butyrate in which the ratio of butyrate radicals to acetate radicals is from 6:1 to 0.4:1, and cellulose propionate.

It will be understood that the temperature at which the potentially adhesive polymer is activated may be modified, for example by the presence of a proportion of a suitable plasticiser. Such modifications may also serve to facilitate formation of the fibres by melt extrusion methods.

As examples of other polymers from which fibres may be formed which are mixed with the potentially adhesive fibres, or from which one component of composite fibres of which a proportion of the surface is potentially adhesive may be composed, are polyesters, polyamides and polyolefines.

The composite, or conjugate, fibres of our invention may be formed, for example, by simultaneous extrusion of at least two streams of fibre-forming polymers through a common aperture, at least one stream being of a potentially adhesive polymer of which the potentially adhesive property may be modified by suitable chemical treatment. It is, of course, necessary that the polymers forming the conjugate fibres should be suitably chosen with relation to each other and the use envisaged. There must for example be an overlap in the range of temperature for each polymer in which it is molten and can be extruded and in which thermal decomposition is no greater than is acceptable.

Suitable polyesters may be found among those derived from at least one aromatic dicarboxylic acid and at least one glycol. Suitable aromatic dicarboxylic acids are, for example, terephthalic acid, 1:2-bis (4-carboxyphenoxy) ethane. A second dicarboxylic acid present in a minor proportion of the units of the polyester chain may, for example, be adipic acid, isophthalic acid or 5-sulphoisophthalic acid. Suitable glycols are, for example, ethylene glycol, 1:4-tetramethylene glycol and 1:4-bis (hydroxymethyl) cyclohexane. A minor proportion of the units of the polyester may also be based on a hydroxy acid, for example parahydroxy benzoic acid. In the case of the use of a copolyester it is necessary for successful fibre-forming properties that at least 75% of the structural units should be of a single formula, for example ethylene terephthalate or 1:4 - tetramethylene terephthalate.

Additionally, the polyesters for use in the process for our invention should of course, be of fibre-forming molecular weight.

Polyamides and copolyamides for use in this invention may be prepared by the polymerisation of diamines and dibasic acids or polyamide-forming functional derivatives of these acids. As examples of suitable diamines may be listed linear polymethylene aliphatic diamines of general formula $H_2N(CH_2)_nNH_2$, where $n$ is not less than 4 and not greater than 20, branched chain aliphatic diamines, for example 2,2,4 - trimethyl hexamethylene diamine; ether diamines, for example 3,3' - diaminopropylether; ethylene bis(3-aminopropyl) ether; cycloaliphatic diamines, for example 1,4 bis (aminomethyl) cyclohexane, bis (4-aminocyclohexyl) methane; aryl aliphatic diamines, for example m-xylylene diamine, p-xylylene diamine; and heterocyclic diamines, for example piperazine.

The above diamines may be condensed singly or in various combinations as appropriate and familiar to those skilled in the art with functional derivatives of oxalic acid; with linear polymethylene dicarboxylic acids (or their polyamide-forming functional derivatives) of general formula $HOOC(CH_2)_mCOOH$, where $m$ is not less than 4 and not greater than 20; with branched-chain aliphatic dicarboxylic acids, for example, 2-methyl butane1,4 - dicarboxylic acid, propane 2,2-dicarboxylic acid, butane 2,2-dicarboxylic acid, Empol dimer acid ($C_{36}$); with cycloaliphatic dicarboxylic acids, for example cyclohexane 1,4-dicarboxylic acid; with aromatic dicarboxylic acids, for example, terephthalic acid, isophthalic acid, 2,5-dimethyl terephthalic acid, napthalene 1,4-dicarboxylic acid, benzophenone 2,4'-dicarboxylic acid; with arylaliphatic dicarboxylic acids, for example 2,5-dimethyl p-phenylene diacetic acid, 2,2-di [p-(carboxymethoxy) phenyl] propane, di [p-(carboxymethyl) phenyl] ether; with heterocyclic dicarboxylic acids, for example furan 2,5-di($\beta$-propionic acid).

Mixtures of these acids may be used to prepare copolyamides.

Polyamides and copolyamides may also be prepared from $\omega$-amino acids or the derived cyclic lactams, used whether alone or in combination with the above diacids and diamines in appropriate stoichiometric balance. For example, $\epsilon$-aminocaproic acid, caprolactam, $\omega$-aminoundecanoic acid, $\omega$-aminododecanoic acid, 7-heptanolactam, 8-octanolactam.

Suitable polyolefines for use in the process of our invention are isotactic polypropylene and poly(-4-methyl pentene-1).

As a guide to the choice of a polyester of appropriate extrusion temperature, it may be noted that copolyesters have lower softening points than homopolyesters of the same basic structural unit. The softening point of a particular polyester may also be lowered by the use of a plasticiser. Similar considerations pertain in the case of polyamides and polyolefines.

In the case of side by side conjugate fibres, it is, of course, necessary that the components have adequate adhesion to each other. In cases wherein there is a problem in this respect, it may be mitigated by known methods, for example the use of a third component providing adequate adhesion to each of the other two components.

When the filaments according to our invention are other than concentric sheath and core, the choice of components having differential physical properties, for example differential shrinkage, will lead to easy formation of crimp in the filaments.

Although the specific description has been confined to hydrolysis, other appropriate chemical treatments, for example ammonolysis or aminolysis, may be used.

Conditions for the chemical treatment of the potentially adhesive polymer to modify its potentially adhesive properties will, of course, be chosen so as to have negligible adverse effect on the polymer or polymers forming the non-potentially adhesive part of a conjugate fibre or forming other fibres present.

When the potentialy adhesive fibres are conjugate fibres of the sheath and core type, and in this case the sheath will be of the potentially adhesive polymer, the chemical treatment will the more easily be confined to the potentially adhesive polymer only. Moreover, in such case the chemical modification may allow the development of surface properties not normally found in a potentially adhesive polymer. For example in the case of a polyester core and a cellulose ester sheath the polyester core confers high strength and the cellulose ester sheath confers desirable surface properties, allowing, for example, greater ease of dyeing. After hydrolytic treatment substantially removing the ester groupings, the advantageous surface properties are enhanced. Moreover, the rendering infusible of the sheath by the hydrolytic treatment makes the filaments less susceptible to short term exposure to a temperature even above that of the core material.

In order that the nature of our invention may the better be understood we give hereinafter examples of putting it into practice.

EXAMPLE 1

Poly(ethylene terephthalate) was prepared according to the known manner having viscosity ratio, as measured as 1 g. per 100 ml. solution in orthochlorophenol at 25° C., of 1.773. The other component was cellulose acetate/butyrate copolymer with acetate to butyrate ratio of approximately 1:1. This latter was cellulose acetate/butyrate as sold under the Registered Trademark Cellidor and designated BspM. The Vicat heat deflection temperature 5 kp. of this, measured in silicone oil, was 79° C.

The two components were dried under vacuum at 60° C. for 12 hours and spun through a 20 hole spinneret with circular holes of diameter 15 thousandths of an inch to give sheath/core filaments of which the poly(ethylene terephthalate) formed the core. The melt temperature of the cellulose acetate/butyrate was 255° C. and that of the poly(ethylene terephthalate), 280° C., and the combined streams were extruded at 280° C. with total throughput of 20 g. per minute and equal weights per minute of each component, and wound up at 4,000 feet per minute. The resultant spun yarn was of 150 g. per denier.

From the as-spun yarn a non-woven fabric was prepared by laying down two interlaced layers to form a web, pressing the web between metal plates and heating in an oven at 200° C. for 15 minutes. The resultant product was a highly bonded, stiff, non-woven sheet.

The non-woven fabric was subjected to saponification by boiling with normal sodium hydroxide to which had been added 20% of its volume of ethanol (100 ml. of total liquid per 5 g. of fabric). The saponification was effected at 60° C. for 45 minutes. The fabric after the saponification treatment was still highly bonded.

Measurement of the moisture regain at room temperature and 65% relative humidity before the spaonification treatment gave a figure of 1%; after the saponification treatment, the moisture regain figure was 4%. In addition, the bonds in the non-woven fabric after saponification were not susceptible to rupture above 200° C.

EXAMPLE 2

Spun yarn of conjugate filaments produced exactly as described in Example 1 was stretched to a stretch ratio of 3.0:1 by passing through a 60:40 by volume mixture of water and dioxan in a bath maintained at 65° C. The stretched yarn on drying possessed a tenacity of 2.0 g. per denier and 20% extensibility. A non-woven fabric was produced from this stretched yarn in a similar manner to that described in Example 1. The tear strength of the resultant fabric was superior to that of the fabric produced in Example 1 before the saponification treatment.

The fabric prepared as described in Example 2 was subjected to saponification treatment exactly as described in Example 1. The fabric after the saponification treatment had superior tear strength to that of the fabric of Example 1 after the saponification treatment.

EXAMPLE 3

Spun cellulose acetate butyrate fibres were randomly laid onto a metal plate and weighted down with a second metal plate. This was placed in an oven at 200° C. for 10 minutes to give a melded fabric. The fabric was then saponified by boiling with normal sodium hydroxide to which had been added 20% of its volume of ethanol (100 ml. of total liquid per 5 g. of fabric) for 30 minutes. The melded fabric remained intact after this treatment, even if pressed onto a hot surface at 210° C. On submitting the melded fabric before the saponification treatment to the same treatment of 210° C. the melded fabric fell apart.

EXAMPLE 4

The procedure in Example 3 was carried out with *drawn* cellulose acetate butyrate giving the same result.

EXAMPLE 5

Fibres of cellulose tripropionate (spun or drawn) were treated in the same fashion as the fibres of cellulose acetate/butyrate in Example 3. The same effect was observed.

EXAMPLE 6

Drawn cellulose triacetate fibre was randomly placed on a metal plate and sprinkled with acetone. A second metal plate was placed onto the fibres and pressed down. Bonding of crossing fibres resulted to produce a melded fabric. This fabric was then saponified by boiling for 30 minutes with normal sodium hydroxide to which had been added 20% of its volume of ethanol (100 ml. of total liquid per 5 g. fabric) to give a fabric unaffected by heat at 200° C. or by acetone, or other solvents. Prior to saponification the fabric would have been seriously affected by acetone treatment.

EXAMPLE 7

Spun polyvinyl acetate fibres (m.wt. 33,000) were randomly laid on a metal plate and sandwiched with a second plate, and placed in an oven at 40° C. A melded fabric resulted which melted at a temperature below 100° C. This fabric was saponified with normal nitric acid to which had been added 10% of its weight of sodium sulphate at 25° C. for 15 minutes, 100 mls. of total liquid being present per 5 g. of fabric. The fabric after the saponification treatment was unaffected by heat at 150° C. Cross-linking of the polyvinyl alcohol with formaldehyde and sulphuric acid rendered it less water soluble.

I claim:

1. A process for the maufacture of an adherent fibrous structure by the formation of a fibrous structure, web or fabric comprising conjugate fibers of which at least a proportion of the surface is comprised of a potentially adhesive polymer having an ester side chain on at least a proportion of the structural unit, activation of at least a proportion of the potentially adhesive polymer temporarily with formation of bonds betwen fibers, followed by chemical hydrolytic treatment of the potentially adhesive polymer with a reagent to render it no longer potentially adhesive by said activation.

2. A process according to Claim 1 in which activation of the potentially adhesive polymer is effected by raising its temperature to that at which it becomes adhesive.

3. A process according to Claim 1 in which activation of the potentially adhesive polymer is effected with the aid of a volatile liquid which softens the polymer rendering it adhesive.

4. A process according to Claim 1 wherein the proportion of the structural units on which there is an ester side chain is at least 50%.

5. A process according to Claim 4 wherein the potentially adhesive polymer is a cellulose ester or a polyvinyl ester.

6. A process according to Claim 5, in which the cellulose ester is cellulose acetate/butyrate, in which the ratio of butyrate radicals to acetate radicals is from 6:1 to 0.4:1, or cellulose propionate.

7. A process according to Claim 5 wherein the chemical treatment is a hydrolytic treatment such that at least 15% of the weight of the potenially adhesive polymer is lost.

8. A process according to Claim 1 in which, in addition to fibres comprised of potentially adhesive polymer, there are present fibres not comprised of potentially adhesive polymer.

9. A process according to Claim 8 wherein the polymer present which is not potentially adhesive is polyester, polyamide or polyolefine, cellulose or a protein.

10. An adherent fibrous structure as manufactured according to the process of Claim 1.

11. A process according to Claim 1 in which the potentially adhesive polymer is selected from the group consisting essentially of cellulose esters and polyvinyl esters and the chemical treatment is a saponification treatment.

References Cited

UNITED STATES PATENTS

| | | | |
|---|---|---|---|
| 3,542,615 | 11/1970 | Dobo et al. | 156—181 |
| 3,531,344 | 9/1970 | Beebe et al. | 156—181 |
| 2,417,453 | 3/1947 | Wade | 156—306 |
| 3,647,591 | 3/1972 | Morris | 156—307 |
| 3,063,454 | 11/1962 | Coates et al. | 156—305 |
| 3,639,195 | 2/1972 | Sanders | 156—181 |
| 3,511,747 | 5/1970 | Davies | 156—181 |
| 3,304,220 | 2/1967 | McIntyre | 156—167 |
| 3,669,788 | 6/1972 | Allman, Jr. et al. | 156—167 |
| 2,976,601 | 3/1961 | Powers | 8—130 |
| 2,647,297 | 8/1953 | Battista | 8—130 |

DANIEL J. FRITSCH, Primary Examiner

U.S. Cl. X.R.

156—167, 181, 305, 306; 161—170